Figure 6:
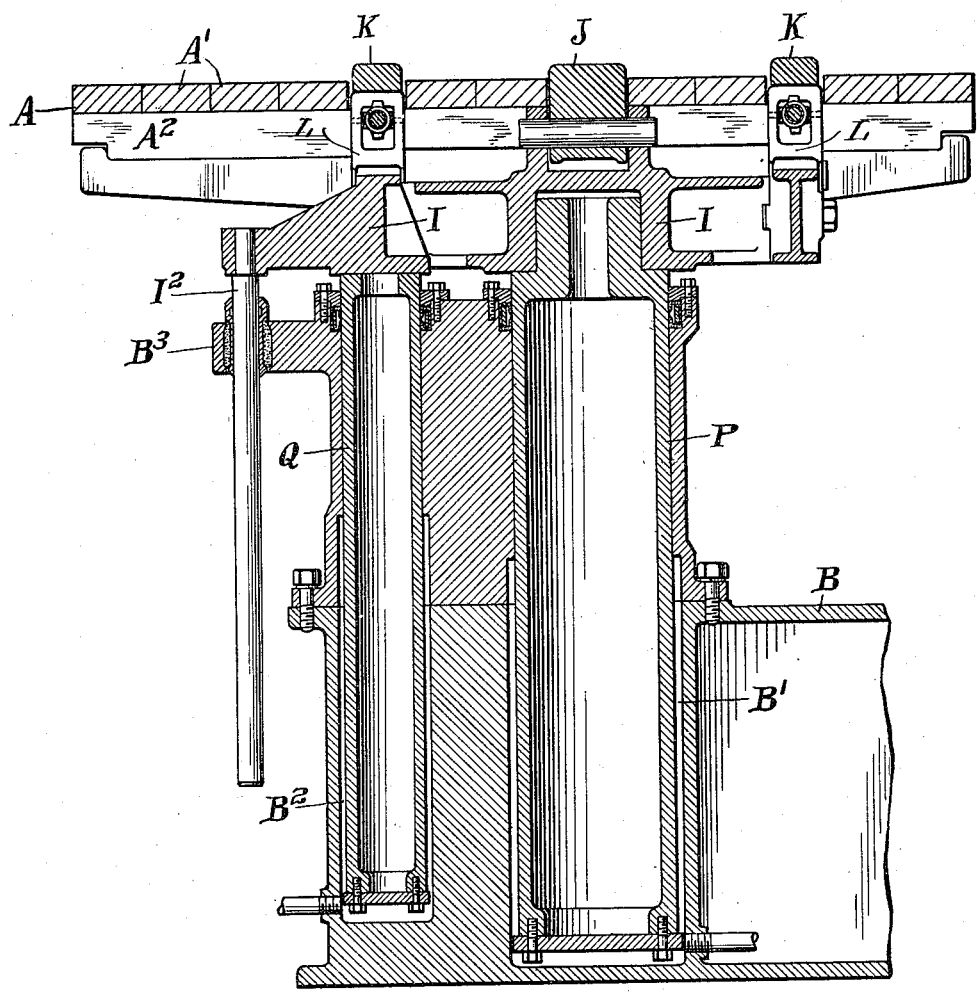

W. LEWIS.
JAR MOLDING MACHINE.
APPLICATION FILED JAN. 9, 1914.
1,157,404.
Patented Oct. 19, 1915.
3 SHEETS—SHEET 1.
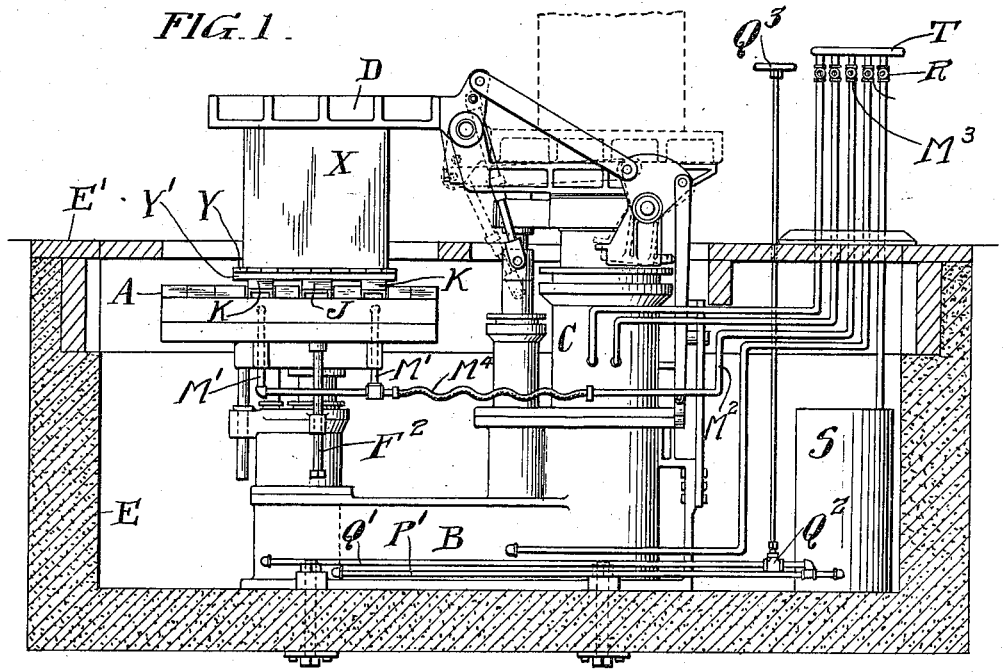
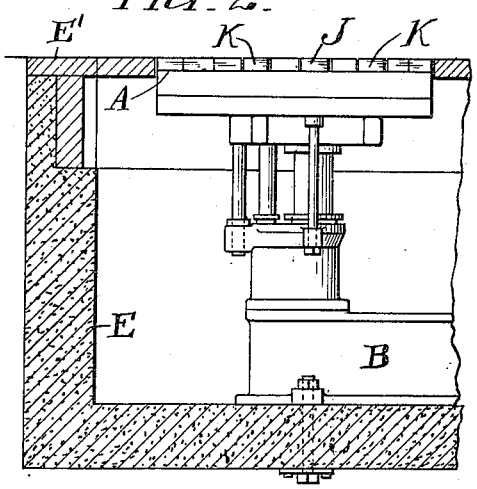
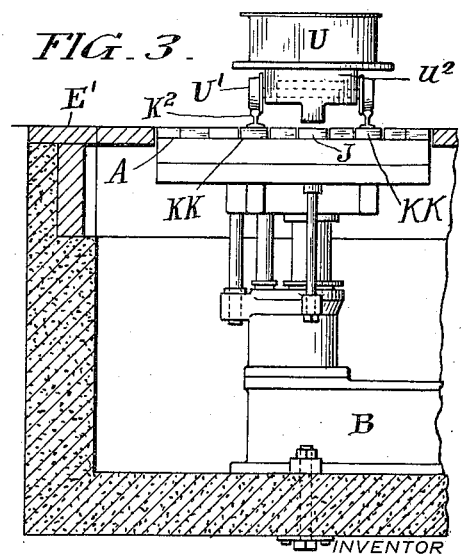

W. LEWIS.
JAR MOLDING MACHINE.
APPLICATION FILED JAN. 9, 1914.
1,157,404.
Patented Oct. 19, 1915.
3 SHEETS—SHEET 2.
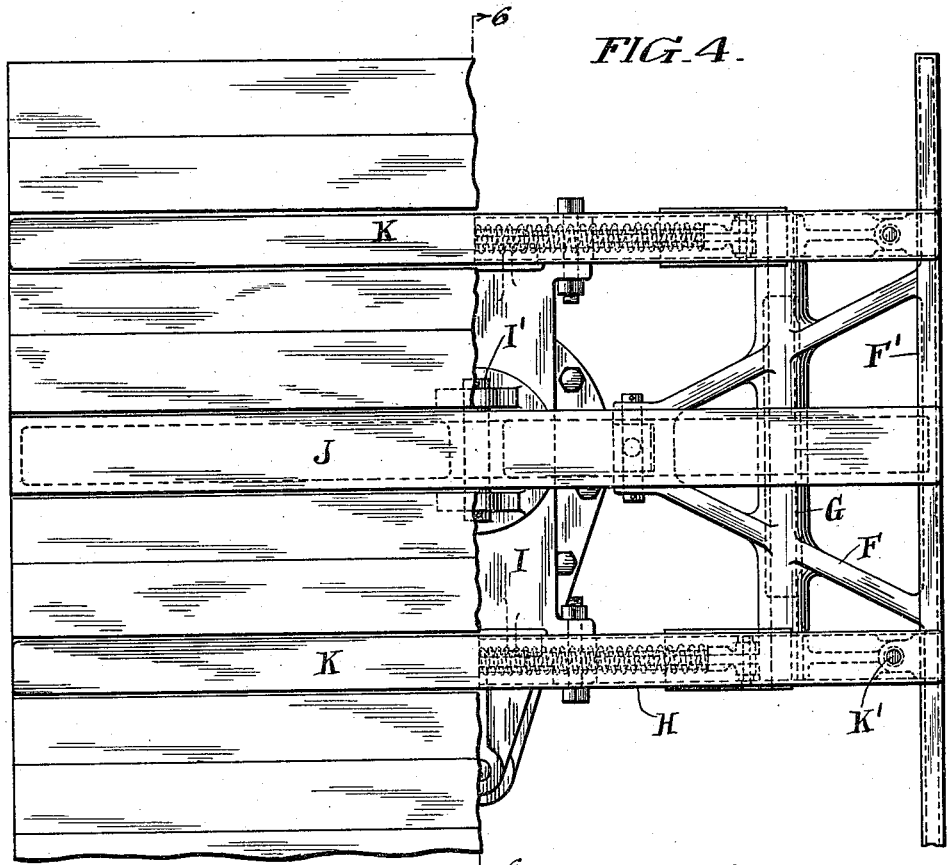
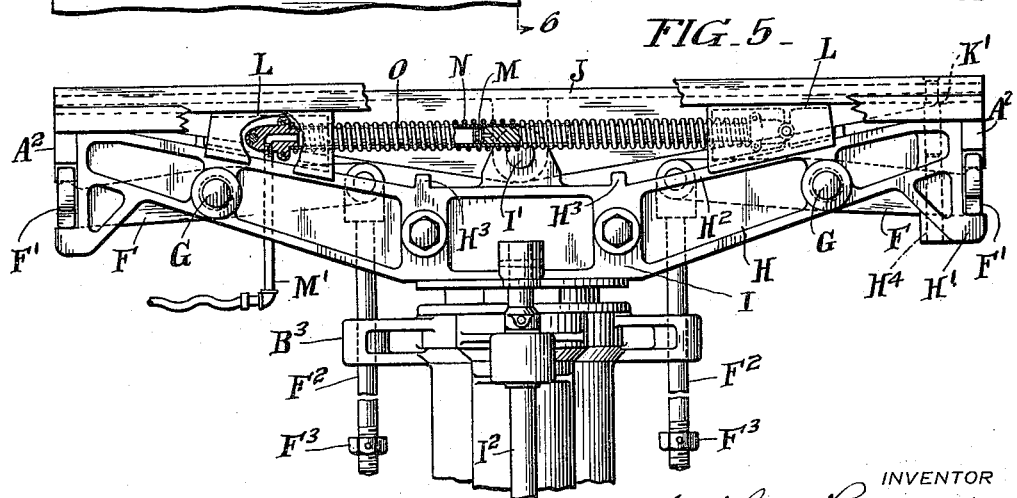
WITNESSES
INVENTOR
Wilfred Lewis
BY
ATTORNEY

W. LEWIS.
JAR MOLDING MACHINE.
APPLICATION FILED JAN. 9, 1914.

1,157,404.

Patented Oct. 19, 1915.
3 SHEETS—SHEET 3.

UNITED STATES PATENT OFFICE.

WILFRED LEWIS, OF PHILADELPHIA, PENNSYLVANIA.

JAR-MOLDING MACHINE.

1,157,404.  Specification of Letters Patent.  Patented Oct. 19, 1915.

Application filed January 9, 1914. Serial No. 811,132.

*To all whom it may concern:*

Be it known that I, WILFRED LEWIS, a citizen of the United States of America, residing in the city and county of Philadelphia, in the State of Pennsylvania, have invented certain new and useful Improvements in Jar-Molding Machines, of which the following is a true and exact description, reference being had to the accompanying drawings, which form a part thereof.

My present invention consists in an improved form of a mold receiving or supporting device particularly adapted for use in connection with a molding machine comprising a roll-over table by which the mold containing flask is swung about a horizontal axis from the position in which the mold forming material is compacted about the patterns, onto the receiving device, and comprising provisions for drawing the patterns by moving them upward out of the mold while the latter is resting upon the receiving device.

One object of the invention is to provide simple and effective means whereby the mold receiving device may be raised and lowered as may be desirable to accommodate molds of different depths, and in particular to bring the mold to or above the floor level at the conclusion of the pattern drawing operation, when, as is frequently desirable, the mold receiving device is mounted in a pit and the mold is placed on it with the lower portion, at least, of the mold below the level of the floor.

A second object of the invention is to provide a mold receiving device with simple and effective leveling provisions, whereby the device will take the weight of a mold placed upon it without tending to move the then upper face of the mold out of parallelism with itself, notwithstanding irregularities which may exist in the mold containing flask or in the bottom board ordinarily interposed between the flask and mold receiving device; and to combine therewith means whereby, when the mold receiving device is raised to the floor level, it is adjusted to provide a smooth platform having its upper surface flush with the floor level.

The various features of novelty which characterize my invention are pointed out with particularity in the claims annexed to and forming a part of this specification.

For a better understanding of the invention, however, and of the advantages possessed by it, reference should be had to the accompanying drawings and descriptive matter, in which I have illustrated and described forms in which my invention may be embodied.

Of the drawings: Figure 1 is a sectional elevation showing molding machinery comprising my improved mold receiving device mounted in a pit with the mold receiving device proper below the floor level; Fig. 2 is a partial sectional elevation, taken similarly to Fig. 1, showing the mold receiving device adjusted to bring its upper surface flush with the floor level; Fig. 3 is a view taken similarly to Fig. 2, showing a modified construction; Fig. 4 is a plan, with parts broken away and removed, of the mold receiving device; Fig. 5 is an end elevation, with parts broken away and removed of the mold receiving device; and Fig. 6 is a vertical section on the line 6—6 of Fig. 4.

In the drawings, and referring first particularly to Fig. 1, A represents the table of a mold receiving device which is mounted on a base or framework B, which also supports a jar ramming machine C, provided with a roll-over table D and mechanism for rocking the latter from the dotted line position shown in Fig. 1 into the full line position shown in that figure in order to deposit the mold or rather the half-mold X on the mold receiving device. After the mold is placed on the receiving device, the roll-over table D is moved vertically upward to draw the patterns which are secured to the table D from the mold. As shown, the molding machinery is mounted in a pit E and the table A of the mold receiving device is substantially below the floor level E′ when the mold is transferred to it. The mold receiving device includes provisions, however, for adjusting the mold receiving device to bring the top of the table A flush with the floor level E′ as shown in Fig. 2.

The particular jar molding machine C proper with its roll-over table D and provisions for rocking the latter shown, comprises various features which are novel with me, but need not be described or illustrated herein, as they are described and claimed in my co-pending application Serial No. 811,131 filed of even date herewith, and form no part of my present invention, which may be used with other known forms of mold compacting and roll-over mechanisms.

The table A comprises planks A′ secured at their ends to crossbeams $A^2$. Each of the two cross beams $A^2$ rests upon the bar like portion $F'$ of a corresponding rocking frame F. Each frame F is fulcrumed on a corresponding shaft G secured at its ends in arms H rigidly secured to and forming a part of a crosshead I. In the mold receiving condition of the apparatus the parts $F'$ rest upon, and the table A is thereby supported, through lugs $H'$ formed on the outer ends of the arms H. In this condition of the apparatus the upper surface of the table A is below the upper edge of a beam J, which extends centrally from one edge to the other of the table, the table being recessed to receive the beam. The beam J is pivotally connected at its center to the crosshead I through a rock shaft $I'$. The table A is also recessed to receive two beams K extending parallel to the beam J, one at each side of the latter, and each located above a corresponding arm H.

To guard against accidental displacement of the bars K, each of the latter is provided at one end with a depending stem $K'$ fitting loosely in the socket $H^4$ formed for the purpose in the corresponding arm H. Each arm H is formed at its opposite ends with inclined guideways $H^2$ on each of which is mounted a wedge block L. To force the pair of wedge blocks L on each arm H apart, and to retract these wedge blocks as hereinafter explained, one wedge block of each pair has pivotally connected to it a plunger M working in a cylinder N pivotally connected to the other wedge block. A helical spring surrounding each coöperating cylinder M and plunger N and connected at its opposite ends to the two corresponding wedge blocks L, normally holds these wedge blocks in their retracted position in which they engage the stops $H^3$. Pressure fluid is admitted to each cylinder M in order to force out the plunger N and thereby spread the wedge blocks apart through a pipe connection $M'$.

The crosshead I is mounted on the upper end of a plunger P working in the cylinder space $B'$ formed in the supporting framework or machine base B. To prevent rotation of the crosshead I and thereby of the mold receiving parts about the axis of the plunger P, a guide pin $I^2$ is secured to the cross head I at a distance from the axis of the plunger P, and this guide pin has a sliding bearing in the flanged portion $B^3$ of the framework B. This flange is also provided with apertures receiving the actuating rods $F^2$ pivotally connected at their upper ends to the frames F and having nuts $F^3$ secured to the lower ends in position to engage the under side of the flange $B^3$ on a predetermined upward movement of the plunger P and crosshead I, and thereby cause the frames F to turn on their shafts G on a further upward movement of the crosshead I and plunger P. As shown, I form a second cylinder space $B^2$ in the framework B to receive a plunger Q. The plunger, Q, as shown, is smaller in diameter than the plunger P and its upper end is adapted to engage the under side of the crosshead I. As shown the cylinder spaces $B'$ and $B^2$ receive water, oil, or other operating liquid under pressure from reservoir S through pipes $P'$ and $Q'$ respectively. The pressure in the reservoir S is regulated by a valve R adapted to connect the reservoir either to the compressed air supply pipe T or to the atmosphere.

$Q^2$ represents a valve by which flow through the pipe $Q'$ can be cut off.

$Q^3$ is the operating handle for the valve $Q^2$. The flexible pipe $M^4$ supplying air to the pipes $M'$ and thereby to the cylinders M may be connected to the atmosphere or to the pipe T through the pipe $M^2$ and valve $M^3$.

In operation, the mold is transferred to the mold receiving device from the roll over table D to which it has previously been secured, when the parts are in the position shown in Fig. 1. When the mold is thus transferred to the mold receiving device, the wedge blocks L should be retracted, and in consequence the weight of the mold is first imposed directly and entirely upon the beam J, and the interposed bottom mold board Y should be so adjusted that the usual cleats $Y'$ will extend transversely to and contact with the beam J. The beam J can rock on its supporting shaft $I'$ as required to firmly seat the mold on the beam. After this occurs compressed air is admitted to the cylinders M, thus spreading each pair of wedge blocks L apart until the corresponding bar K firmly engages the ends of the cleats $Y'$ at the opposite sides of the beam J, thus holding the bottom wall board and the mold against movement in any direction during the subsequent pattern drawing operation. The wedge block separating mechanism should be so proportioned however, that there will be no tendency for the bars K to lift the mold off the beam J. After the mold is thus properly mounted on the receiving device, the flask is disconnected from the roll over table D, and the latter is moved vertically upward to draw the mold. The pressure fluid is then admitted to the lower end of the cylinder chamber $B'$ to raise the crosshead I and parts carried by the latter. The initial upward movement of the crosshead I does not affect the relative positions of the beams J, bars K and table A. As the crosshead approaches the upward limit of its movement, however, the stops $F^3$ secured to the rods $F^2$ engage the under side of the flange $D^3$ so that the final portion of the upward movement of the crosshead I causes the rocking frames F to turn about their support shafts G, and thereby lift the outer portions F' of these frames off the lugs H'. This lifts the table A relative to the beams J and K, and advantageously the apparatus is so proportioned and adjusted that when the crosshead reaches the upward limit of its movement, the parts F' will be so elevated relative to the lugs H' that the top surface of the platform boards A' will be flush with the floor level E' and with the top surfaces of the beams J and K, which are also engaged by the platform beams A² and held parallel with the floor boards when the apparatus is in the position shown in Fig. 2. This facilitates the removal of the mold, and other operations which may be carried on in the vicinity, by entirely closing the top of the pit E, and at the same time avoiding projections above the floor level over which workmen are liable to trip.

Pressure fluid may be admitted to and exhausted from the lower end of the cylinder space B² simultaneously with the admission to and exhaust from the chamber B' in which case the plunger Q will simply supplement the action of the plunger P in raising and lowering the crosshead I. By providing the stop valve Q² in the pipe connecting the reservoir S to the cylinder space B², it is possible to trap the required amount of liquid in the space B² to enable the plunger Q to serve as an adjustable stop limiting the downward movement of the crosshead I. This is desirable where a series of similar molds are handled in succession, for instance, as it enables the mold supporting device to be readily and quickly adjusted to the exact height which is most convenient for the transfer thereto of such molds.

Where, as is sometimes desirable, the mold is transferred from a roll-over table directly onto a car, the receiving mechanism shown may be used with but slight modification, as shown in Fig. 3. In this figure U represents the car on which the mold X is deposited, and U' the wheels of the car. As shown, the car U is formed with transverse frame members U² adapted to bear on the beam J of the mold receiving device, just as the cleats Y' engage this beam in the apparatus shown in Fig. 1. In the construction shown in Fig. 3, however, the members KK replacing the members K of Fig. 1, are formed with portions K² forming track rails for the wheels U', and the parts are so proportioned that when the apparatus of Fig. 3 is adjusted to bring the top of the table A flush with the floor level E', the rails K² will project above the floor level so that they may register with track rails mounted on the floor and will extend high enough above the floor level to lift the car off the beam J. When in the mold receiving position, however, the parts KK should be lowered with respect to the bar J sufficiently to permit of such tilting movement of the car U as may be necessary to enable it to properly take the mold.

While in accordance with the provisions of the statutes, I have illustrated and described the best forms of my invention now known to me, it will be apparent to those skilled in the art that changes may be made in the forms of apparatus disclosed without departing from the spirit of my invention, and that under some conditions certain features of my invention may be used without a corresponding use of other features.

Having now described my invention, what I claim as new and desire to secure by Letters Patent, is:

1. A device for the purpose described comprising in combination, a main supporting member, adjustable devices mounted on said member for engaging a mold lowered onto said devices, a platform mounted on said member and apertured to permit the passage therethrough of said devices and means for adjusting said platform vertically relative to said member.

2. A device for the purpose described comprising in combination, a main supporting member, an element pivoted thereon, means adjustably mounted on said member for engaging a mold resting on said element to hold said mold against movement relative to said member, a platform mounted on said member and apertured to permit the passage therethrough of said element and means, and means for adjusting said platform vertically relative to said member.

3. A device for the purpose specified comprising in combination, a base, a main supporting member, a beam pivotally connected adjacent its center to said member, a pair of bars supported by said member one at each side of said beam, means for adjusting said bars to cause the latter to bear against the under side of a mold resting on said beam, a table mounted on said member and formed with apertures receiving said beam and bars, and means for adjusting said table from one position in which said beam projects above said table and said beam and bars are free to adjust themselves to accommodate a mold supported thereby into a second position in which said table is substantially flush with the tops of said bars and beam.

4. A device for the purpose described comprising in combination, a main supporting member, adjustable devices mounted on said member for engaging a mold lowered onto said device, a platform mounted on said member and apertured to permit the passage therethrough of said devices, means for imparting vertical movements to said member, and means actuated by a predetermined vertical movement of said member for raising said platform relative to said member.

5. A device for the purpose specified comprising in combination, a base, a main supporting member vertically movable on said base, devices adjustably mounted on said member for engaging a mold lowered onto said device, a platform mounted on said member and formed with apertures through which said devices may project, means for moving said member vertically relative to said base, and means actuated by the relative movements of said member and base for adjusting said platform from one position in which said devices may project above said table, and may be adjusted to accommodate a mold lowered onto them, into a second position in which the tops of said devices are substantially flush with the top of said platform.

6. A device for the purpose specified comprising in combination, a base, a main supporting member mounted on and vertically movable with respect to said base, adjustable devices mounted on said member and adapted to engage and support a mold lowered onto said devices, a platform mounted on said support and formed with apertures through which said devices may project, levers mounted on said member and connections between said base and levers whereby the latter are caused to engage said platform and lift it relative to said member on a predetermined vertical movement of the latter.

7. A device for the purpose specified comprising in combination, a base, a crosshead vertically movable thereon, a beam pivotally connected adjacent its center to said crosshead, a pair of bars one at each side of said beam and means for adjusting said bars to cause the latter to bear against the under side of a mold resting on said beam, a table mounted on said crosshead and formed with apertures receiving said beam and bars, and means for adjusting said table, on a predetermined vertical movement of said crosshead, from one position in which said beam projects above said table and said beam and bars may be adjusted to accommodate a mold supported thereby into a second position in which said table is substantially flush with the tops of said bars and beam, said means comprising levers pivoted on said crosshead and connections between said levers and said base.

8. A device for the purpose specified comprising in combination, a main supporting member, a beam pivotally connected adjacent its center to said member, a pair of bars adjustably mounted on said member at the sides of said beam, means for adjusting said bars to cause the latter to bear against the under side of a mold resting on said beam, a platform mounted on said member and formed with apertures receiving said beam and bars, and means for adjusting said platform from one position in which said beam projects above said platform and said beam and bars may be adjusted to accommodate a mold lowered thereon, into a second position in which said beam and bars are engaged and supported by said platform.

9. In a roll-over molding machine, the combination of a base, a mold receiving device mounted thereon and comprising a main mold supporting member vertically movable relative to said base, means for moving said member vertically relative to said base, and an adjustable stop limiting the vertical movement of said member in its downward direction comprising coöperating piston and cylinder elements extending between said member and base, and means for locking a definite amount of liquid in said cylinder element.

10. In a roll-over molding machine, the combination with a base, of a mold receiving device mounted thereon and comprising a main mold supporting member, said member and base having coöperating piston and cylinder parts, means regulating the admission to and exhaust from said cylinder part of a pressure fluid for raising and lowering said member, a second pair of coöperating piston and cylinder parts interposed between said base and said member and means for locking a predetermined amount of liquid in the last mentioned cylinder element to thereby fix the limit to the downward movement of said member.

WILFRED LEWIS.

Witnesses:
ARNOLD KATZ,
F. STEWART.

Copies of this patent may be obtained for five cents each, by addressing the "Commissioner of Patents, Washington, D. C."